United States Patent Office 2,716,634
Patented Aug. 30, 1955

---

2,716,634

TRANSPARENT RUST PREVENTIVE CUTTING OIL COMPOSITION

James F. Black, Roselle, and John D. Oathout, Cranford, N. J., assignors to Esso Research and Engineering Company, a corporation of Delaware No Drawing. Application March 17, 1953,
Serial No. 342,958

13 Claims. (Cl. 252—33.4)

This invention relates to transparent aqueous-base compositions useful as cutting oils, rust preventives and the like. It is particularly concerned with aqueous-base compositions containing sulfonates that have excellent rust preventive and surface wetting and protecting properties.

It is well known in the art to employ oil-base compositions containing petroleum sulfonates and the like as emulsions with water for cold working of metals as in machining, drawing, punching, etc. These so-called soluble oil compositions aid in extending the life of cutting tools, remove heat generated during the cutting operation and have other beneficial effects. Because of the relatively high content of mineral oil, vegetable oil or the like in these materials, the water emulsions are opaque and milky. Consequently they tend to obscure or hide the parts being machined and the machining tools. This makes it difficult to observe the effects of tool wear and the finish being obtained on machined parts. This causes a generally reduced working speed. These so called soluble oils or emulsions also tend to separate or stratify on storage. The prior art compositions are also usually deficient with respect to wetting and rust preventing properties. Apparently the relatively high ratio of oil to sulfonate salt that has been considered desirable to obtain proper lubrication adversely affects wetting properties. Some of the petroleum sulfonates themselves also cause rusting, but improved resistance to rusting has been obtained in some cases by incorporating known rust inhibitors such as metal nitrites, metal chromates, etc. in the compositions.

Aqueous-base compositions containing various soluble inorganic salts have also been suggested as cutting and cooling fluids. Although these materials have some advantages over the above oil-base compositions, they are usually deficient in wetting and lubrication properties.

It is a principal object of the present invention to develop an extremely useful formulation that minimizes the disadvantages inherent in such compositions of the prior art.

In accordance with the present invention, a composition suitable for compositing with water consists essentially of a major proportion of a mixture of substantially equal amounts of a mineral oil and oil-soluble alkali metal petroleum sulfonates. It includes minor portions of a rust inhibitor selected from the group consisting of alkali metal nitrites and alkali metal chromates, and of an acidic material selected from the group consisting of alkali metal dihydrogen phosphates and long chain monocarboxylic aliphatic acids. Peferably the mixture also contains a small amount of an alkali metal carbonate.

It has been found that this mixture is soluble in water in almost all proportions. Its aqueous solutions are homogeneous, transparent and only slightly colored, making them very useful for efficient cutting operations. The solutions are also stable and show no tendency to separate even after long storage periods. Dilute aqueous solutions of the composition are as effective in machining operations as the prior art compositions containing higher relative proportions of oil. The excellent wetting and rust preventing characteristics of the aqueous solutions also serves to protect machined parts during and after machining operations. The materials are also useful as temporary rust-preventing coating compositions for metals because of these characteristics.

Although prior art compositions have used nitrite and chromate salts as rust inhibitors, it has been found that these salts are not sufficiently potent to give satisfactory rust protection when used with mixtures containing low oil to sulfonate ratios. The addition of one of the acidic materials mentioned heretofore, preferably in combination with the alkali metal carbonate, has been found to be necessary to give the high degree of rust protection desired in compositions of this type. The reason for this improvement is not understood at this time, although possibly the auxiliary materials act as buffering agents in controlling the hydrogen ion concentration in the aqueous media.

The advantages of the compositions of the present invention and their performance in comparison with prior art products are demonstrated in the following examples:

*Example 1.—Rusting characteristics of blends containing various inhibitors*

A series of aqueous cutting oil blends were prepared that consisted chiefly of water and sodium petroleum sulfonate and that contained in some cases various amounts and types of rust inhibitors and auxiliary agents. Each blend contained 4% by weight of a mineral oil concentrate containing 50% by weight of a conventionally prepared oil-soluble sodium petroleum sulfonate having an average molecular weight of about 470. The other additives used in preparing the blends were sodium nitrite, sodium chromate, sodium carbonate, sodium dihydrogen-phosphate and oleic acid. Each of the blends were straw-colored and transparent.

Each blend was then tested for its rusting tendency by the following test: Gooch crucibles containing chips of SAE 1020 steel (containing 0.18–0.23% carbon and 0.30–0.60% manganese) were washed with concentrated hydrochloric acid diluted with an equal volume of water, rinsed twice with distilled water, dipped in the blend being tested, drained, and exposed to the atmosphere at ambient temperatures for 18 hours. The steel chips were then removed, inspected, and assigned a rust rating according to the following scale:

| Scale Reading | Extent of Rusting |
|---|---|
| 0 | None. |
| 1 | Trace. |
| 2 | Light. |
| 3 | Moderate. |
| 4 | Heavy. |

The results obtained in tests on blends containing sodium nitrite inhibitor are shown in Table I below. All rust ratings are the averages of at least two tests made on the same blend.

TABLE I.—RUSTING TENDENCIES OF AQUEOUS SOLUTIONS OF SODIUM SULFONATE CONTAINING SODIUM NITRITE AND OTHER ADDITIVES

| Additive in Blend [1] | Amount in Blend, Weight Percent [2] | | | | | | | |
|---|---|---|---|---|---|---|---|---|
| | Blend No. 1 | Blend No. 2 | Blend No. 3 | Blend No. 4 | Blend No. 5 | Blend No. 6 | Blend No. 7 | Blend No. 8 |
| Sodium Nitrite | 0 | 0.2 (0.1) | 0.5 (0.25) | 0 | 0.1 (0.05) | 0.2 (0.1) | 0.1 (0.05) | 0.2 (0.1) |
| Sodium Dihydrogen Phosphate | 0 | 0 | 0 | 0.1 (0.05) | 0.1 (0.05) | 0.2 (0.1) | 0 | 0 |
| Oleic Acid | 0 | 0 | 0 | 0 | 0 | 0 | 0.1 (0.05) | 0.2 (0.1) |
| Sodium Carbonate | 0 | 0 | 0 | 0 | 0.2 (0.1) | 0.4 (0.2) | 0 | 0 |
| Average Rust Rating | 3.0 | 2.5 | 2.0 | 2 | 0.7 | 0 | 1.0 | 1.0 |

[1] All blends contained 2% by weight of sodium petroleum sulfonate and 2% by weight of mineral oil, with the remainder being water and the additives shown.
[2] Numbers in parentheses below amounts are part by weight of ingredient per part by weight of sodium sulfonate.

The blend of water and sodium sulfonates (blend 1) caused appreciable rusting, and this rusting was not materially reduced by the addition of either 0.2 or 0.5 weight per cent sodium nitrite (blends 2 and 3) or of sodium dihydrogen phosphate (blend 4). Combinations of sodium nitrite and oleic acid gave much better protection than did the nitrite salt alone. Only a slight trace or no rusting was obtained with blends containing the nitrite in combination with the phosphate and carbonate salts.

Table II, below, presents the results of tests on blends including sodium chromate.

TABLE II.—RUSTING TENDENCIES OF AQUEOUS SOLUTIONS OF SODIUM SULFONATE CONTAINING SODIUM CHROMATE AND OTHER ADDITIVES

| Additive in Blend [1] | Amount in Blend, Weight Percent [2] | | | | |
|---|---|---|---|---|---|
| | Blend No. 9 | Blend No. 10 | Blend No. 11 | Blend No. 12 | Blend No. 13 |
| Sodium Chromate | 0.2 (0.1) | 0.01 (0.005) | 0.05 (0.025) | 0.1 (0.05) | 0.2 (0.1) |
| Sodium Dihydrogen Phosphate | 0.1 (0.05) | 0.01 (0.005) | 0.05 (0.025) | 0.1 (0.05) | 0.2 (0.1) |
| Sodium Carbonate | 0 | 0.02 (0.01) | 0.10 (0.05) | 0.2 (0.1) | 0.4 (0.2) |
| Average Rust Rating | 0.3 | 2 | 1.0 | 0 | 0 |

[1] All blends contained 2% by weight of sodium petroleum sulfonate and 2% by weight of mineral oil, with the remainder being water and the additives shown.
[2] Numbers in parentheses below amounts are part by weight of ingredient per part by weight of sodium sulfonate.

The above-described rust test was carried out on emulsions of water and several typical commercially available soluble cutting oil concentrates. Commercial concentrate A had the following composition:

| Component | Amount, Weight Percent |
|---|---|
| Mineral Oil Base Stock | 75.55 |
| 50% Oil Soluble Sodium Petroleum Sulfonates in Mineral Oil | 19.00 |
| Naphthenic Acids | 2.50 |
| Caustic Soda | 0.40 |
| Isopropyl Alcohol | 0.90 |
| Water | 1.60 |
| Natural Wax | 0.05 |

This concentrate contained a total of 85.05% mineral oil and 9.5% sulfonate. The weight ratio of oil to sulfonate and of sodium napthenates to sulfonate were, respectively, about 9:1 and 0.3:1. This concentrate was blended with various amounts of water in order to vary the concentration of active ingredient in the blends. Commercial concentrates B and C had approximately the same ingredients in about the same concentrations as those in concentrate A. These two concentrates were also diluted with water and tested. The composition and test results for these mixtures are compared below in Table III with those of blend 6 from Table I.

TABLE III

| Commercial Soluble Oil Concentrate | | A | | | B | C |
|---|---|---|---|---|---|---|
| Blend No | 6 | 14 | 15 | 16 | 17 | 18 |
| Water to Oil Concentrate, Ratio in Blend | | 4:1 | 20:1 | 40:1 | 40:1 | 40:1 |
| Approximate Composition of Blend, Weight Percent: | | | | | | |
| Water | 95.2 | 80.0 | 95.2 | 97.6 | 97.6 | 97.6 |
| Mineral Oil | 2.0 | 17.0 | 4.1 | 2.1 | 2.1 | 2.1 |
| Sodium Petroleum Sulfonate | 2.0 | 2.0 | 0.5 | 0.2 | 0.2 | 0.2 |
| Sodium Naphthenates | 0 | 0.6 | 0.1 | ([1]) | ([1]) | ([1]) |
| Sodium Nitrite | 0.2 | 0 | 0 | 0 | 0 | 0 |
| Sodium Dihydrogen Phosphate | 0.2 | 0 | 0 | 0 | 0 | 0 |
| Sodium Carbonate | 0.4 | 0 | 0 | 0 | 0 | 0 |
| Inspections on Blend: | | | | | | |
| Appearance | Transparent | Milky | Milky | Milky | Milky | Milky |
| Average Rust Rating | 0 | 1.0 [2] | 1.0 | 1.0 | 1.5 | 1.0 |

[1] Below 0.1%.
[2] Heavy blue stain on chips.

The blend containing a combination of chromate and phosphate gave only a slight trace of rust (blend 9). The additional use of sodium carbonate gave superior protection when these additives were used in sufficiently high concentrations (blends 12 and 13).

The blends prepared from commercial products caused rusting regardless of the concentration used in water, whereas a perfect test was obtained with the blend of this invention (blend 6). A blue stain appeared on the chips contacted by blend 14; this blend contained about the same concentration of sulfonates as did blend 6. In contrast to blend 6, the commercial blends were opaque, milky and non-transparent emulsions.

*Example II.—Stability of aqueous concentrates*

A concentrate was prepared consisting of 30 weight percent water, 29.1% sodium sulfonate, 29.1% mineral oil, 2.9% each of sodium nitrite and sodium dihydrogen phosphate, and 6% sodium carbonate, the active ingredients being present in the same weight ratios that were used in the case of blend 6 in Table I. This concentrate was placed on storage at room temperature. It was shown to have excellent stability characteristics inasmuch as there was no change in color or evidence of separation of any of the components after storage for over one year.

*Example III.—Wetting characteristics of various soluble oil blends*

The wetting characteristics of various blends were first tested by dropping a portion of the blend on a polished steel panel to determine its spreading characteristics. A portion was then further tested by rubbing it between two polished steel panels and observing whether or not the blend quickly separated and withdrew into drops. The compositions of the present invention, such as blends 6, 8, 12 and 13 of Tables I and II, showed excellent spreading characteristics, and the resulting films did not separate readily during the rubbing test. Prior art soluble oil emulsions, such as blends 14 through 18 of Table III, did not spread readily on the panels, and furthermore separated quickly into drops during the rubbing test. These tests show that the aqueous compositions taught herein have distinctly superior wetting characteristics when compared with prior art soluble oil compositions.

*Example IV.—Cutting characteristics of various soluble oil blends*

Blend 8 (containing oleic acid) of Table I, emulsions containing 10 parts of water to one part of either commercial concentrate A or commercial concentrate B (of Example I), and water were evaluated by a lathe test conducted as follows: Using a standard machine shop lathe, high-speed steel tools were run to failure (breakdown of the cutting edge) during a single point turning operation on SAE 4340 molybdenum steel (0.38–0.43% carbon; 0.60–0.80% manganese; phosphorus maximum 0.040%; sulfur maximum 0.040%; 0.20–0.35% silicon; 1.65–2.00% nickel; 0.70–0.90% chromium; 0.20–0.30% molybdenum). The depth of cut was 0.125 inch and the feed was 0.020 inch per revolution. The range of cutting speeds was approximately 100–140 S. F. P. M. (surfaces feet per minute). The fluid under test was directed by means of a nozzle to the center of the cutting zone. By determining the lives of several cutting tools at several different cutting speeds, it was possible to establish a correlation between cutting speed in S. F. P. M. and tool life, in minutes. For different cutting fluids a comparison of the effect of the fluid on tool life at one cutting speed, as taken from the correlation, is a measure of the effectiveness of that fluid. Or, the cutting speed permissible for a given tool life may also serve as a comparison for the effectiveness of the fluid.

The results of these tests are shown in Table IV, below:

TABLE IV

| Material Tested | Blend 8 | Water: Conc. A, 10:1 | Water: Conc. B, 10:1 | Water |
|---|---|---|---|---|
| Tool Life, Minutes For Cutting speed of 100 S. F. P. M. | 30 | 29 | 30 | 12 |
| Cutting Speed, S. F. P. M. For tool life of 60 minutes | 91 | 90 | 93 | 80 |

Water alone does not give good cutting performance. The blend of the present invention containing an oil to sulfonate weight ratio of 1:1 gave performance comparable to that obtained with prior art compositions containing an oil to sulfoniate ratio of about 9:1.

The oil-soluble alkali metal petroleum sulfonates useful in the present composition are well known in the petroleum art. They are generally prepared by refining mineral oils with concentrated or fuming sulfuric acid to form a sludge containing sulfonic acid from which the "mahogany" or oil-soluble soaps may be separated by treatment with an alkali metal base followed by extraction. These soaps are usually available as about 30 to 70% concentrates in mineral lubricating oil. Although any of the alkali metal soaps are useful, sodium sulfonates are preferred in view of their cheapness, availability and effectiveness.

The mineral lubricant oil used in conjunction with the sulfonate soap is preferably that present in the soap concentrate. However, if dry soaps are used or if additional oil must be added, any suitable lubricant base stock derived from one of the asphaltic, paraffinic, mixed base or other crudes may be used. It will of course be selected with a view to suitable flash point, viscosity and other properties for the particular use. The weight ratio of lubricating oil to sulfonate soap will be in the range of about 0.5:1 to 2:1, preferably about 1:1. Smaller concentrations will not generally provide adequate lubrication in machining. Larger concentrations impair wetting, transparency and stability properties, and cause emulsion formation when blended with water.

The weight ratio of the alkali metal nitrites or chromates to sulfonate soaps is generally in the range of about 0.02:1 to 0.4:1, preferably about 0.1:1. Ratios higher than this seem to have little or no effect in reducing rust inhibition beyond a certain minimum point achieved with ratios in the range given. The sodium salts are preferred.

The weight ratio of the acidic components to the sulfonate salt will generally range from about 0.02:1 to 0.4:1, preferably 0.1:1. Although the alkali metal dihydrogen phosphates are particularly advantageous, especially the sodium salt, the long chain aliphatic monocarboxylic acids may also be used to advantage. These acids should have in the range of about 12 to 22 carbon atoms in the aliphatic chain. The aliphatic portion may be saturated or unsaturated. Specific acids include dodecyl acid, palmitic acid, stearic acid, oleic acid and the like.

In order to obtain substantially perfect rust protection, an alkali metal carbonate should also be composited with the other ingredients. The most effective weight ratio of carbonate to sulfonate soap will generally be in the range of about 0.02:1 to 0.5:1, preferably about 0.2:1. While various alkali metal salts, such as those of potassium and lithium are useful, sodium carbonate is especially preferred.

The combination of the above active ingredients may be dissolved in water to form concentrates containing in the general range of about 20 to 70% water. The concentrates are conveniently stored and shipped as such. They will not corrode or rust ordinary metal containers or separate during storage. When the composition is to be applied as a rust preventive or to be used as a cutting oil or the like, it is merely blended with additional water to form a dilute solution containing in the range of about 2 to 20% active ingredient. For example, a blend containing about 95% water and 5% of the active ingredients is very useful as a cutting oil.

What is claimed is:

1. A water soluble composition suitable for use in aqueous cutting oils and rust preventatives consisting essentially of a mixture of one part by weight of an oil-soluble alkali metal petroleum sulfonate, in the range of 0.5 to 2.0 parts by weight of a mineral lubricant base stock, in the range of 0.02 to 0.4 part by weight of a rust inhibitor selected from the group consisting of alkali metal nitrites and alkali metal chromates, and in the range of 0.02 to 0.4 part by weight of an acidic material selected from the group consisting of alkali metal dihydrogen phosphates and long chain aliphatic monocarboxylic acids having about 12–22 carbon atoms in the aliphatic chain.

2. A composition as in claim 1 wherein said mixture includes in the range of 0.02 to 0.5 part by weight of an alkali metal carbonate.

3. A composition as in claim 1 wherein said sulfonate is sodium sulfonate.

4. A composition as in claim 3 wherein said nitrite is sodium nitrite.

5. A composition as in claim 4 wherein said acidic material is sodium dihydrogen phosphate.

6. A composition as in claim 5 wherein said mixture includes in the range of 0.02 to 0.5 part by weight of sodium carbonate.

7. A composition as in claim 4 wherein said acidic material is oleic acid.

8. A composition as in claim 7 wherein said mixture includes in the range of 0.02 to 0.5 part by weight of sodium carbonate.

9. A composition as in claim 3 wherein said chromate is sodium chromate.

10. A composition as in claim 9 wherein said acidic material is sodium dihydrogen phosphate.

11. A composition as in claim 10 wherein said mixture includes in the range of 0.02 to 0.5 part by weight of sodium carbonate.

12. An aqueous, transparent composition for use as a rust preventive cutting oil comprising a solution of a major proportion of water and about 2–20% of a mixture of about one part by weight of oil-soluble sodium petroleum sulfonate, one part by weight of a mineral lubricant base stock, 0.1 part by weight of sodium nitrite, 0.1 part by weight of sodium dihydrogen phosphate, and 0.2 part by weight of sodium carbonate.

13. An aqueous, transparent composition for use as a rust preventive cutting oil comprising a solution of a major proportion of water and about 2–20% of a mixture of about one part by weight of oil-soluble sodium petroleum sulfonate, one part by weight of a mineral lubricant base stock, 0.1 part by weight of sodium chromate, 0.1 part by weight of sodium dihydrogen phosphate, and 0.2 part by weight of sodium carbonate.

References Cited in the file of this patent

UNITED STATES PATENTS

| | | |
|---|---|---|
| 2,353,830 | Kaufman et al. | July 18, 1944 |
| 2,432,784 | Miller et al. | Dec. 16, 1947 |
| 2,455,659 | Duncan et al. | Dec. 7, 1948 |